United States Patent [19]

Mori

[11] 4,033,872
[45] July 5, 1977

[54] RESERVOIR TANK

[75] Inventor: Yoshiro Mori, Sagamihara, Japan

[73] Assignee: Nissan Motor Co., Ltd., Yokohama, Japan

[22] Filed: Nov. 7, 1975

[21] Appl. No.: 630,079

[30] Foreign Application Priority Data

Nov. 8, 1974  Japan .................. 49-134453[U]

[52] U.S. Cl. ............................ 210/168; 137/571; 210/172; 210/196; 210/316; 210/448; 220/85 R; 220/85 UR

[51] Int. Cl.² .................................. B65D 25/00

[58] Field of Search .......... 220/86 R, 85 F, 85 UR, 220/85 US, 85 S, 85 R; 210/172, 196, 316, 314, 416, 448, 335, 336, 261, 310, 257, 261, 168; 137/571, 573, 574, 575, 545, 597

[56] References Cited

UNITED STATES PATENTS

| | | | |
|---|---|---|---|
| 1,217,732 | 2/1917 | Fedders | 210/172 |
| 1,454,971 | 5/1923 | Louf | 220/86 R |
| 2,637,513 | 5/1953 | Wallen | 220/86 R |
| 3,214,023 | 10/1965 | Donner | 210/172 |
| 3,275,148 | 9/1966 | Vicino | 210/196 |
| 3,282,428 | 11/1966 | Rosaen | 210/314 |
| 3,458,050 | 7/1969 | Cooper | 210/448 |
| 3,883,430 | 5/1975 | Codo | 210/172 |

*Primary Examiner*—William Price
*Assistant Examiner*—Allan N. Shoap

[57] ABSTRACT

A reservoir tank has filling and outlet ports which are provided in a common aperture formed through the tank top.

7 Claims, 6 Drawing Figures

RESERVOIR TANK

The present invention relates generally to a reservoir tank, provided therein with an oil filler, which is employed in a hydraulic system equipped in, for example, a motor vehicle and particularly to a reservoir tank of this type in which both an inlet or filler port and an outlet port are provided in a common opening formed through the top of the tank.

As is well known in the art, a reservoir tank of this type comprises a top provided therethrough with an inlet or filler port through which hydraulic fluid is replenished into the tank and an outlet port which is connected to a pump of a hydraulic system and through which hydraulic fluid is drawn and pumped from the tank into the hydraulic system.

A conventional construction of the reservoir tank has been such that the top is formed therethrough with two separate apertures and that the inlet or filler port and the outlet port are provided respectively in the apertures. An aperture in the tank top is usually formed by the so-called projection molding and one mold is necessary for formation of one aperture. However, the manufacture of a mold is troublesome and accordingly expensive. Thus, a conventional reservoir tank has been difficult in manufacture and expensive since two molds are required for the formation of the two apertures through the top of the tank. Furthermore, the conventional reservoir tank requires a rather great length or width owing to the provision of the two apertures in the top. Still futhermore, the conventional reservoir tank has had a disadvantage in that the degree of option of the position of one of the two apertures is reduced owing to the existence of the other aperture.

It is, therefore, an object of the invention to provide a reservoir tank in which both inlet or filler and outlet ports are provided in a common aperture formed through the top so that the formation of merely a single aperture is necessary for the provision of the filler and outlet ports in the tank to make the tank easy to manufacture and inexpensive and to minimize the length or width of the tank and to increase the degree of option of the position of each of the filler and outlet ports.

This and other objects and advantages of the invention will become more apparent from the following detailed description taken in conjunction with the accompanying drawings in which.

Figure 1:
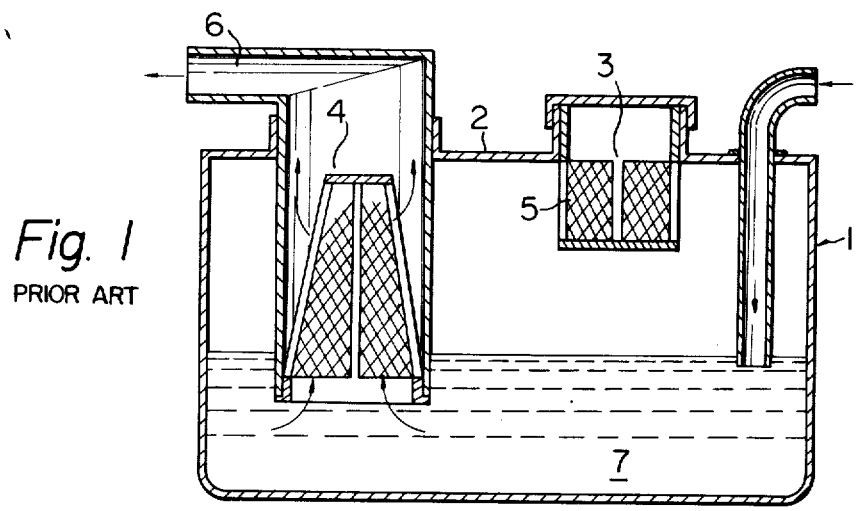
FIG. 1 is a schematic cross sectional view of a conventional reservoir tank.

Referring to FIG. 1 of the drawings, there is shown a conventional reservoir tank as per the introduction of the present specification. As shown in FIG. 1, the conventional reservoir tank, generally designated by the reference numeral 1, comprises a tank top 2 which is formed therethrough with two separate apertures 3 and 4 for filler and outlet ports, respectively. The apertures 3 and 4 are provided therein respectively with a filler port or chamber 5 and an elongate outlet port or chamber 6 which contacts at one end with hydraulic fluid 7 contained in the tank 1 and is connected at the other end to an inlet port of a hydraulic system (not shown) and through which hydraulic fluid is drawn by suction from the tank 1 into the pump when the pump is operated. Thus, the conventional reservoir tank is rather large in length or width, and furthermore, it has been difficult to manufacture and it is expensive since it is necessary to produce two molds for the formation of the apertures 3 and 4.

Figure 2:
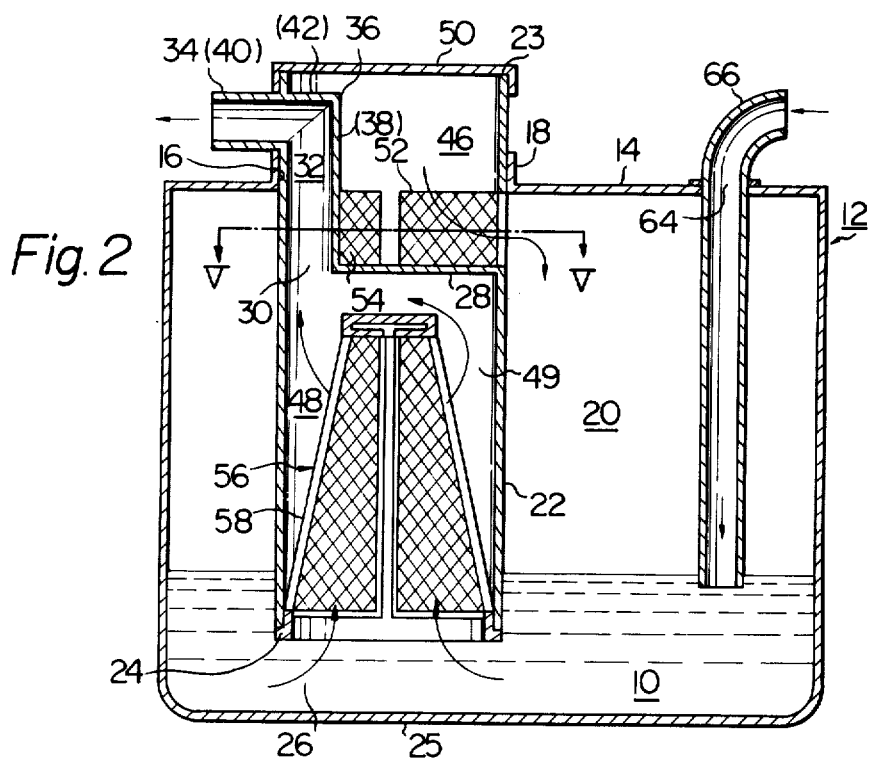
FIG. 2 is a schematic cross sectional view of a preferred embodiment of a reservoir tank according to the invention.

Referring to FIG. 2 of the drawings, a reservoir tank according to the invention is shown as storing therein hydrualic fluid 10 which is maintained above a low limit or safe level (not shown). The reservoir tank, generally designated by the reference numeral 12, comprises a tank top 14 which is formed therethrough with a first aperture 16 and has a continuous rim 18 extending a suitable distance upwardly from the top 14 around the aperture 16. The tank 12 has an interior space 20 which is defined between the top 14 and the surface of the hydraulic fluid 10.

An elongate hollow member or duct 22 extends vertically downwardly from the outside of the tank 12 thereinto through the aperture 16 and is fixedly secured at its periphery to the top 14. The hollow member 22 has an open top end 23 projecting a suitable distance above the rim 18 and an open bottom end 24 projecting or submerging a suitable distance below the low limit level of the hydraulic fluid 10. The hollow member 22 is of a suitable shape such as, for example, a cylinder as shown in FIGS. 3 to 6 of the drawings. It is desirable that the open bottom end 24 of the hollow member 22 extends to a position adjacent to the bottom 25 of the tank 12 to the extent that a clearance 26 between the open bottom end 24 and the bottom 25 has no influence on or does not impede the flow of hydraulic fluid passing through the clearance 26 into the hollow member 22. By this arrangement the low limit level of the hydraulic fluid 10 is as low as possible so that the size of the tank 12 can be reduced.

Figure 4:
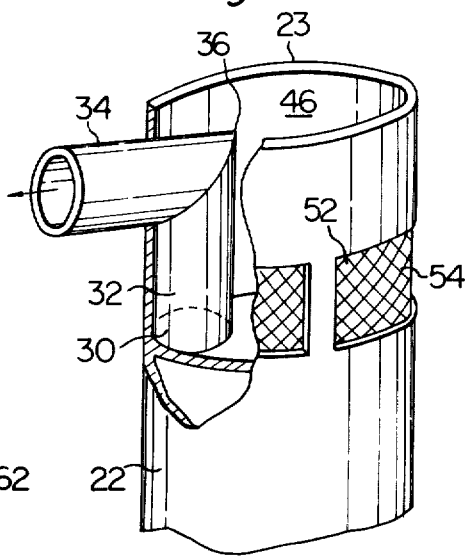
FIG. 4 is a schematic perspective view of a filler inlet chamber and an outlet passage of the tank shown in FIG. 2.
Figure 5:
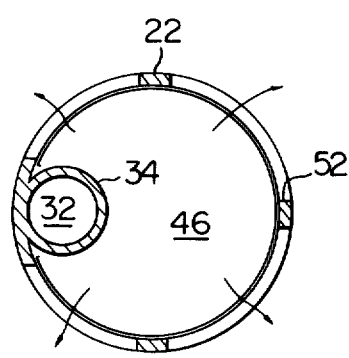
FIG. 5 is a schematic cross sectional view, taken substantially along a line V—V, of a first example of the outlet passage of the tank shown in FIG. 2.
Figure 6:
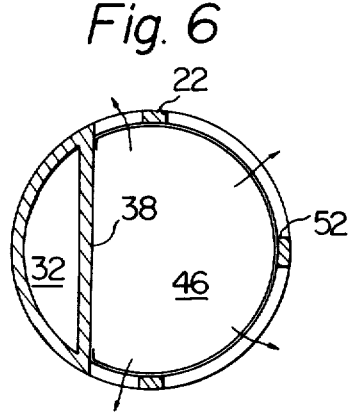
FIG. 6 is a schematic cross sectional view, similar to FIG. 5, of a second example of the outlet passage.

A partition member 28 is positioned in the hollow member 22 horizontally or transversely to the longitudinal axis thereof and is located a suitable distance below the level of the top 14. The partition member 28 is fixedly secured at its periphery to an inside surface of the wall of the hollow member 22 and is formed at a peripheral end portion with an opening 30. The hollow member 22 is formed through a wall thereof at a position just above the rim 18 with an aperture 31. An outlet passage 32 extends from the opening 30 into the outside of the tank 12 through the aperture 31. The opening 30 may have, for example, a circular shape as shown in FIGS. 4 and 5. In this instance, the passage 32 is formed by a conduit 34 which has a circular cross section and extends upwardly vertically or in parallel with the longitudinal axis of the hollow member 22 from the partition member 28 around the opening 30 into a location above the level of the rim 18, as shown in FIGS. 2 and 4. The conduit 34 is bent substantially at a right angle or horizontally at a point 36 adjacent to the aperture 31 and then extends into the outside of the hollow member 22 through the aperture 31. The conduit 34 is securely connected to the hollow member 22 and the partition member 28. Alternatively, the opening 30 may have, for example, an arcuate or segmental shape as shown in FIG. 6 so that the opening 30 is interposed between the hollow member 22 and a peripheral end of the partition member 28. In this instance, the passage 32 is formed by the hollow member 22 and a flat partition member 38; and a conduit 40. The partition member 38 extends upwardly vertically or in parallel with the longitudinal axis of the hollow member 22 from the partition member 28 about the opening 30 to the level of the top of the aperture 31 and is located opposite to the aperture 31 and is fixedly connected at its side ends and its bottom end, respectively, to the hollow member 22 and the partition member 28, as shown in FIGS. 2 and 6. A gap between the hollow member 22 and the top end of the partition member 38 is closed by an end wall 42 which is fixedly connected to the hollow member 22 and the top end of the partition member 38. The conduit 40 extends horizontally from the hollow member 22 from the aperture 31 and into the outside of the hollow member 22, as shown in FIG. 2.

Figure 3:
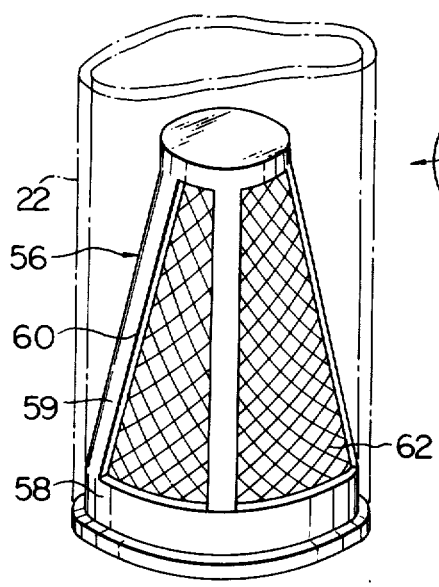
FIG. 3 is a schematic perspective view of an oil filter assembly provided in an outlet chamber of the tank shown in FIG. 2.

The interior of the hollow member 22 is divided into a filler or upper chamber 46 which is defined between the horizontal partition member 28, a wall of the hollow member 22 above it, and vertical partition member such as the conduit 34 or the partition member 38 and laterally outlet passage 32, and an outlet or lower chamber 48 comprising the passage 32 and a chamber 49 which is defined between the partition member 28 and the wall of the hollow member 22 below it. The upper chamber 46 is a fluid filler port of the tank 12 for filling it up. The open top end 23 of the upper chamber 46 is covered by a closure member or lid 50 which is removably mounted on the open top end 23. The hollow member 22 has a plurality of apertures 52 which are formed through the hollow member 22 between the top 14 and the partition member 28 and around the inlet chamber 46 and which each opens into the interior space 20 of the tank 12, as shown in FIGS. 2 and 4 the hollow member 22 and the horizontal and vertical partition members 28 and 36 or 38 defining the outlet passage 32 and the outlet chamber 49 are impervious to suction which acts on the outlet chamber 49 through the aperture 31, to allow hydraulic fluid in the tank 12 to be drawn by the suction action to the outside of the tank through the outlet chamber and passage 49 and 32. The entire area of each of the apertures 52 is covered by an oil filter 54 which is in the form of a net made of, for example, nylon fiber and is fixedly secured to or formed integrally with the hollow member 22 around the apertures 52. An oil filter assembly 56 is provided in the chamber 49 to cover the entire horizontal cross sectional area of the hollow member 22. The oil filter assembly 56 includes a casing 58 in the form of a truncated cone or innerted funnel, as shown in FIGS. 2 and 3. The casing 58 has an upper blind end and a lower open end; and a tapered wall 59 which is formed therethrough with apertures 60. Each of the apertures 60 is covered by an oil filter 62, such as the oil filter 54, which is fixedly secured to the casing 58 around the apertures 60. The oil filter assembly 56 is securely fixed at the open lower end to the open bottom end 24 of the hollow member 22.

The top 14 of the tank 12 is also formed therethrough with a aperture 64. A conduit 66 extends vertically dowwardly from the outside of the tank 12 thereinto through the aperture 64 and is fixedly connected to the top 14 around the aperture 64. The conduit 66 projects a suitable distance below the low limit level of the hydraulic fluid 10.

The tank 12 may be incorporated into a hydraulic system (not shown) which is equipped in, for example, a motor vehicle and comprises a pump and an actuator connected to the pump. The acutator may be, for example, a hydraulic power braking device, a hydraulic power steering device, a hydraulic power suspension device or a compound hydraulic power device comprising two or more actuators. When the tank 12 is incorporated into the hydraulic system, the conduit 34 or 40 is connected to an inlet port of the pump and the conduit 66 is connected to a fluid return line connected to the actuator. The tank 12 may be also incorporated into a hydraulic system which comprises a pump, an actuator connected to the pump, an unloading pressure control valve or relief valve disposed between the pump and the actuator, and an accumulator connected to the relief valve. In this instance, the conduit 66 is connected to a fluid return line connected to the actuator and the relief valve.

The reservoir tank 12 thus far described is operated as follows:

When a pump of a hydraulic system is operated with the outlet passage 32 connected to an inlet port of said pump, hydraulic fluid is drawn by suction from the tank 12 below the outlet chamber 48 into the pump through the oil filter assembly 56 and the passage 32. Even if the surface of hydraulic fluid in the tank 12 is considerably lowered when the open bottom end 24 of the hollow member 22 extends to a position close to the bottom 25 of the tank 12 to the extent stated above, the open bottom end 24 is below the surface of hydraulic fluid and accordingly hydraulic fluid is effectively and surely drawn by the pump thereinto. After the hydraulic fluid has been fed to an actuator of the hydraulic system and employed in the actuator, it is returned into the tank 12 through a fluid return line of the hydraulic system and the conduit 66.

When it is desired to replenish the tank 12, the lid 50 is removed from the open top end 23 of the inlet chamber 46 and hydraulic fluid is delivered from the inlet chamber 46 into the interior space 20 of the tank 12 through the oil filter 54.

It will be appreciated that the invention provides a reservoir tank in which both inlet and outlet ports are provided in a common aperture formed through the tank top so that the formation of a single aperture is necessary for the provision of the inlet and outlet ports in the tank to keep the length or width of the tank small and to make the tank easy to manufacture and inexpensive and to increase the degree of option of the position of each of the inlet and outlet ports, and in which the open bottom end of a hollow member extends to a position close to the bottom of the tank to the extent stated hereinbefore so that the low limit level of hydraulic fluid contained in the tank is lowered and the size of the tank can be kept small.

What is claimed is:

1. A reservoir tank for use in a hydraulic system, comprising a tank top formed therethrough with a first aperture, a hollow member vertically extending from the outside of said tank thereinto through said first aperture and having therein a filling chamber, an outlet chamber located below said filling chamber, and an outlet passage located laterally of said filling chamber and above said outlet chamber and communicating with said outlet chamber, said hollow member having a bottom end which submerges into and communicates with hydraulic fluid in said tank, a horizontal partition member horizontally located in said hollow member and separating said filling chamber and said outlet chamber from each other, a vertical partition member fixedly connected to said horizontal partition member and vertically extending upwardly from said horizontal partition member and separating said filling chamber and said outlet passage from each other, said filling chamber communicating with the outside of said tank for delivery of hydraulic fluid thereinto, said hollow member being formed therethrough below said tank top with a second aperture opening from said filling chamber into said tank for admission of said hydraulic fluid in said filling chamber thereinto, said hollow member being formed therethrough above said tank top with a third aperture opening from said outlet passage into the outside of said tank.

2. A reservoir tank as claimed in claim 1, in which said hollow member comprises a cylindrical member.

3. A reservoir tank as claimed in claim 1, in which said hollow member and said vertical and horizontal partition members defining said outlet passage and said outlet chamber are impervious to, when suction acts on said outlet chamber through said third aperture, allow hydraulic fluid in said tank to be drawn by the suction to the outside of said tank through said outlet chamber and said outlet passage.

4. A reservoir tank as claimed in claim 1, in which said tank top is further formed therethrough with an aperture through which hydraulic fluid used in said hydraulic system is returned into said tank.

5. A reservoir tank as claimed in claim 1, in which said cylindrical member has a first oil filter covering said second aperture and a second oil filter having the shape of an inverted funnel and covering the horizontal cross sectional area of said outlet chamber.

6. A reservoir tank as claimed in claim 1, in which said horizontal partition member is formed therein at a periphery thereof with a circular aperture providing communication between said outlet passage and said outlet chamber, and said vertical partition member comprises a conduit being circular in cross section shape and interconnecting said circular aperture and said third aperture.

7. A reservoir tank as claimed in claim 1, in which said horizontal partition member has an arcuate aperture formed between an edge thereof and said hollow member and providing communication between said outlet passage and said outlet chamber, and said vertical partition member comprises a flat member fixedly connected to said edge of said horizontal partition member and to said hollow member and defining a space above said arcuate aperture together with said hollow member.

* * * * *